E. G. W. Bartlett,
Impts in Clothes Wringers.
116665      PATENTED JUL. 4 1871
Fig. 1.      Fig. 2.
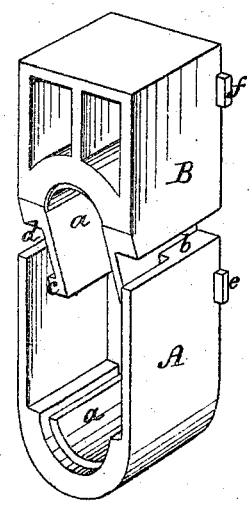
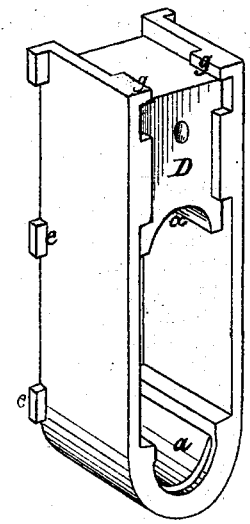
Fig. 3.
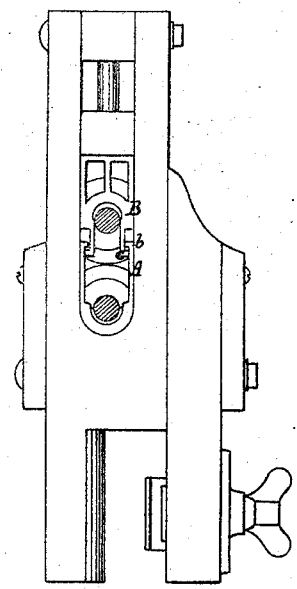
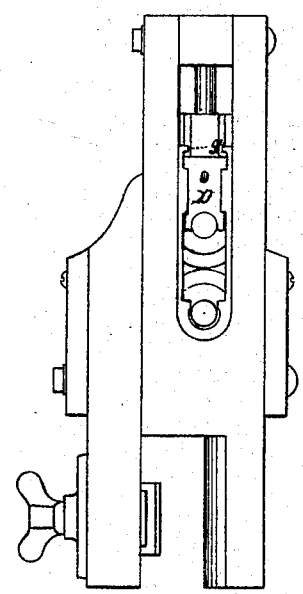
Witnesses
Phil H. Larner,
F. Jackson,
Inventor.
E. G. W. Bartlett.
By Wm C. Wood
Attorney.

UNITED STATES PATENT OFFICE.

ELBRIDGE G. W. BARTLETT, OF PROVIDENCE, RHODE ISLAND, ASSIGNOR TO PROVIDENCE TOOL COMPANY, OF SAME PLACE.

IMPROVEMENT IN CLOTHES-WRINGERS.

Specification forming part of Letters Patent No. 116,665, dated July 4, 1871.

*To all whom it may concern:*

Be it known that I, ELBRIDGE G. W. BARTLETT, of the city and county of Providence and State of Rhode Island, have invented certain new and useful Improvements in Clothes-Wringers.

My invention relates to that class of wringers in which the rolls are mounted in wooden frames; and consists in certain novel metallic journal-box casings particularly applicable to wooden slotted standards; and I do hereby declare that the following specification, taken in connection with the drawing furnished and forming a part of the same, is a clear, true, and exact description thereof.

Figure 1 represents, in perspective, the metallic casing and roller journal-boxes adapted for use at their geared ends. It is composed of two parts, A for the lower and B for the upper roller. Both are provided with semicircular recesses $a$ for holding securely any suitable bearing which may be placed therein. The upper inside ends of the casing A are provided with inward-projecting shoulders $b$. The lower outer ends of the casing B are recessed, and from the recessed surface there are outward-projecting shoulders $c$. The journal-bearings cannot approach each other nearer than is desired for a proper working of the gears by reason of the stop-joint formed by the contact of the upper edges of the casing A with the lower edges of the recesses in B, as shown in the drawing at $d$. The bearings cannot separate so as to allow the unmeshing of the gears, by reason of the stop-joint formed by the contact of the shoulders $b$ and $c$. The casing A is vertically secured in its position by the projections $e$ on the edge of the casing, which are tenoned into mortises cut in the wooden standard. The upper casing B has a flat bearing-surface on top, with which the end of the compressing spring-bar of the wringer is in contact. It has, also, two projecting guide-blocks, $f$, cast on the outer edge near its top, which, by a sliding contact with the side of the wooden standard, serve to keep the casing vertical.

Fig. 2 represents, in perspective, the casing and journal-boxes for the rollers, adapted for use at the ends which are not geared. As the bearings of the rolls at this end cannot, under any circumstances, be made to approach too near each other, it is not necessary to have a stop-joint, and therefore the casing is made in one instead of in two parts. The lower portion of this casing is substantially like the part A already described, and is provided with the recess $a$ for receiving the bearing, and also with corresponding projections, $e$, which are tenoned into corresponding mortises cut in the standard. At the upper inside edges are two inward-projecting shoulders, $g$. D is the journal-box for the upper roll. It can be made of wood or of metal, or corresponding with the part B already described. It is fitted to slide vertically inside the casing, and is limited in its upward movement by a stop-joint formed by the contact of its upper end with the under side of the projecting shoulder $g$. The end of the pressure-spring of the wringer is always in contact with the top of the journal D, which corresponds in this particular with the part B, already described. When in proper position they are confined within corresponding vertical limits.

Fig. 3 represents, in elevation, the two end views of a wringer, showing the wooden standards with the journal-boxes and casings in position. The gears and crank are removed to show clearly the parts which would otherwise be partially concealed.

By combining my journal-boxes and casings with the wooden standards, I am enabled to renew, at any time, the several bearings, and the rollers may always be maintained in their proper relative positions.

As heretofore constructed, wringers with wooden standards, after considerable use, were liable to have the bearings so worn that the rolls would draw away from the compressing spring-bar, and therefore fail to work properly.

With my present improvement the wooden standards are in no manner subject to wear.

I have found that leather bearings serve an excellent purpose in connection with my metallic casings, especially when applied to the ends of the rollers opposite the gears.

Having thus described my invention, I claim as new and desire to secure by Letters Patent—

1. The journal-casing, consisting of the parts A and B, provided with stop-joints $d$ and $b\,c$, substantially as described.

2. The journal-casing, Fig. 2, provided with the lower stationary bearing, the upper sliding journal-box D, and the stop-joint at $g$, substantially as shown and described.

ELBRIDGE G. W. BARTLETT.

Witnesses:
JOHN D. THURSTON,
PETER F. HUGHES.